C. L. BAKER.
PLOW WHEEL ADJUSTER.
APPLICATION FILED JULY 25, 1917.
1,336,550.
Patented Apr. 13, 1920.
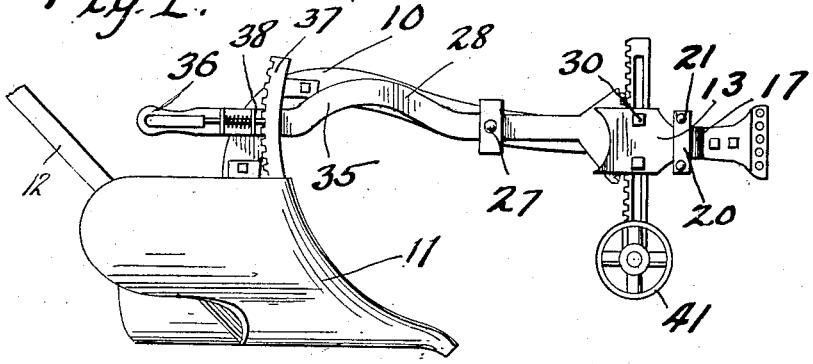
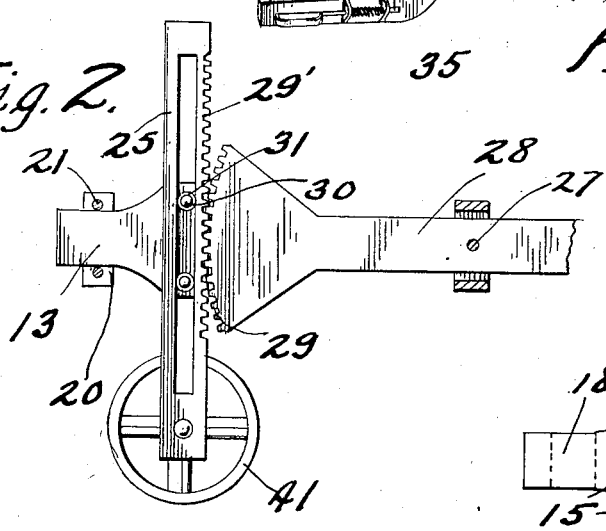
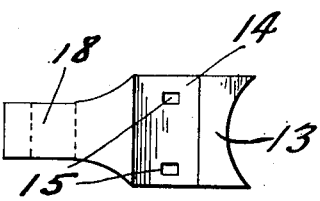
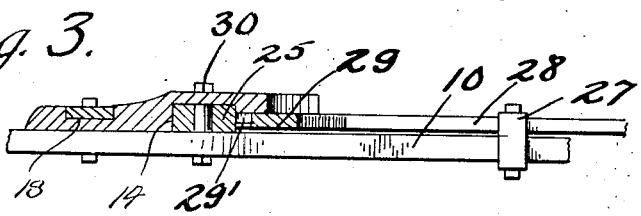
Witness
Walling
Inventor
C. L. Baker
By Chandler & Chandler
Attorney

UNITED STATES PATENT OFFICE.

CLYDE L. BAKER, OF CENTRAL LAKE, MICHIGAN.

PLOW-WHEEL ADJUSTER.

1,336,550.  Specification of Letters Patent.  Patented Apr. 13, 1920.

Application filed July 25, 1917. Serial No. 182,704.

*To all whom it may concern:*

Be it known that I, CLYDE L. BAKER, a citizen of the United States, residing at Central Lake, in the county of Antrim, State of Michigan, have invented certain new and useful Improvements in Plow-Wheel Adjusters; and I do hereby declare the following to be a full, clear, and exact description of the invention, such as will enable others skilled in the art to which it appertains to make and use the same.

This invention relates to new and useful improvements in agricultural implements and pertains more particularly to plows.

The primary object of the present invention is to provide a gage wheel for plows which is removably secured to the plow beam and is capable of vertical adjustment in order that the depth of the furrow cut by the plow may be regulated.

A further object of the present invention is to provide means by which the gage wheel may be actuated by the driver of the plow, without it being necessary to stop the plowing operation.

Referring to the drawings,

Figure 1, is a view in elevation of a plow equipped with the present invention,

Fig. 2, is a detail view of the operating lever,

Fig. 3, is a transverse sectional view on the line 3—3 of Fig. 1,

Fig. 4, is a detail view of the operating lever, and

Fig. 5, is a detail view with one of the clamps removed.

Referring more particularly to the drawings, the reference character 10 designates a plow beam and 11 designates the plow share, the handles being designated by the numeral 12. Adapted to be secured to the forward end of the plow beam, is a clamp member 13 which clamp member is provided with a forwardly extending portion 17 in which is positioned a transversely extending groove 18.

On the face of the forwardly extending portion 17 opposite to that of the groove 18, the clamp member 13 is provided with a transversely extending groove 14 which is perforated near each end as at 15 to provide suitable openings by which the device is adapted to be secured to the plow beam 10.

Adapted to be received within the transversely extending groove 18 is a clamp member 20 which in turn is provided with a plurality of spaced openings 21 through which bolts are adapted to pass for securing the member 20 in the desired position.

Mounted between the clamp member 13 and the plow beam 10 is a slotted wheel standard 25, one edge of which is provided with a plurality of rack teeth 29, through the perforations 15 of the clamp member 13 are bolts 30 which are adapted to pass through the slots of the slotted member 25 and mounted on said bolts are rollers 31, which rollers lie in the slot of the slotted member 25 and form an anti-friction bearing therefor in its movement vertically of the plow beam.

A lever 28 is pivoted at 27 and is bent downwardly as at 35 and is provided with a handle portion 36, and rigidly secured to the plow beam is a toothed arcuate member 37 with which a latch 38 is adapted to engage, said latch being carried by the handle portions 36 and being adapted to retain the lever 28 in its adjusted position. The other end of this lever 28 is provided with an arcuate toothed member 29, the teeth of which are adapted to mesh with the teeth 29' of the slotted standard 25 as shown in Fig. 2.

Carried by the lower end of the slotted standard 25 is a roller 41 which is adapted to be moved to or from the ground surface for the purpose of regulating the distance between the ground and the plow beam, and thereby regulate the depth of the furrow cut by the plow.

The operation of the device is as follows:

If the furrow being cut by the share is too shallow, the handle 36 is grasped and the lever 28 is rocked about its pivot to elevate the slotted standard 25 and thereby raise the roller 41 from the ground, and when said roller has been raised the desired amount, the latch 38 of the lever 36 is engaged with the rigid arcuate member 37 to retain the lever in its adjusted position. If, however, it is desired to cut a shallow furrow, the lever 28 is rocked on its pivot to move the slotted member 26 and lower the roller to the ground thereby raising the plow beam and changing the angle of the plow share relative to the ground in order that the same may cut a more shallow furrow than would be the case if the plow beam were adjusted to occupy a position closer to the surface of the ground.

Having thus described the invention, what is claimed is:

A shiftable gage wheel attachment for plow beams adjustable for movement through different limits and comprising a housing having an extension recessed to receive a removable attaching clamp, said housing having a pair of vertically spaced direction rollers therein, a gage wheel having a standard provided with a longitudinal slot in which both rollers are received for longitudinal adjustment of the standard with respect to the housing, said standard having rack teeth along one longitudinal edge exposed outwardly of the housing, and a lever having means for pivotally connecting it with a plow beam without perforation of the latter and having at one end a segmental gear removably engaged with the rack teeth and having less angular extent than the longitudinal extent of the rack teeth.

In testimony whereof I affix my signature in the presence of two witnesses.

CLYDE L. BAKER.

Witnesses:
 NELSON BAKER,
 ASA G. MAXWELL.